United States Patent
Watson et al.

(10) Patent No.: US 10,764,609 B2
(45) Date of Patent: Sep. 1, 2020

(54) SYSTEMS AND METHODS FOR CREATING BROADCAST MEDIA CHANNELS PLAYING MEDIA CONTENTS BASED ON USER RATINGS

(71) Applicant: Disney Enterprises, Inc., Burbank, CA (US)

(72) Inventors: Scott F. Watson, Marina Del Rey, CA (US); Skarphedinn Hedinsson, Encino, CA (US)

(73) Assignee: Disney Enterprises Inc., Burbank, CA (US)

( * ) Notice: Subject to any disclaimer, the term of this patent is extended or adjusted under 35 U.S.C. 154(b) by 0 days.

(21) Appl. No.: 15/158,050

(22) Filed: May 18, 2016

(65) Prior Publication Data

US 2017/0339434 A1    Nov. 23, 2017

(51) Int. Cl.
*H04N 21/234*    (2011.01)
*H04N 21/475*    (2011.01)
*H04N 21/2668*    (2011.01)
*H04N 21/482*    (2011.01)

(52) U.S. Cl.
CPC ....... *H04N 21/234* (2013.01); *H04N 21/2668* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 2002/0174439 A1* | 11/2002 | Akiyama | H04N 5/76 725/100 |
| 2002/0194598 A1* | 12/2002 | Connelly | H04H 60/06 725/39 |
| 2005/0229220 A1* | 10/2005 | Fisher | H04N 7/17318 725/89 |
| 2005/0235330 A1* | 10/2005 | O'Donnell | H04N 7/17336 725/87 |
| 2008/0189272 A1* | 8/2008 | Powers | G06F 17/30817 |
| 2009/0043906 A1* | 2/2009 | Hurst | H04N 21/23439 709/231 |
| 2009/0327222 A1* | 12/2009 | Spitzer-Williams | G06F 17/30029 |
| 2010/0070490 A1* | 3/2010 | Amidon | G06F 17/3002 707/722 |
| 2010/0082731 A1* | 4/2010 | Haughay | G06F 17/30749 709/203 |
| 2010/0287033 A1* | 11/2010 | Mathur | G06Q 50/01 705/319 |

(Continued)

*Primary Examiner* — Nasser M Goodarzi
*Assistant Examiner* — Terrika Peterson
(74) *Attorney, Agent, or Firm* — Farjami & Farjami LLP

(57) ABSTRACT

There is provided a system including a non-transitory memory storing an executable code and a hardware processor executing the executable code to provide access to a plurality of media contents in a content repository, wherein each of the plurality of media contents has a rating, receive a rating input from a user device assigning a user rating to a first media content of the plurality of media contents, update the rating of the first media content based on the rating input, if the rating of the first media content exceeds a threshold, add the first media content to a programming queue of a broadcast channel, and transmit the first media content to a plurality of user devices on via the broadcast channel.

18 Claims, 4 Drawing Sheets

(56) References Cited

U.S. PATENT DOCUMENTS

| | | | |
|---|---|---|---|
| 2011/0109648 A1* | 5/2011 | Roberts | H04N 21/4788 345/629 |
| 2012/0158492 A1* | 6/2012 | Ye | G06Q 30/0241 705/14.49 |
| 2013/0031162 A1* | 1/2013 | Willis | H04L 67/02 709/203 |
| 2013/0191399 A1* | 7/2013 | Tocaben | G06F 17/3053 707/748 |
| 2013/0227612 A1* | 8/2013 | Abboa-Offei | H04N 21/482 725/46 |
| 2013/0276024 A1* | 10/2013 | Grant | H04N 21/23424 725/34 |
| 2014/0108946 A1* | 4/2014 | Olofsson | G06Q 50/01 715/739 |
| 2015/0081452 A1* | 3/2015 | Anthony | G06Q 30/0271 705/14.67 |

* cited by examiner

SYSTEMS AND METHODS FOR CREATING BROADCAST MEDIA CHANNELS PLAYING MEDIA CONTENTS BASED ON USER RATINGS

BACKGROUND

Conventionally, broadcast companies adhere to a broadcast schedule for a number of months before canceling less popular shows and moving shows that are more popular to more desirable broadcast time slots. Recent advances in on-demand programming have given more control to viewers, allowing the viewers to select which television shows and/or movies to watch and when to watch them. However, that is where the flexibility of on-demand video services ends.

SUMMARY

The present disclosure is directed to systems and methods for creating a broadcast channel playing media contents based on user ratings, substantially as shown in and/or described in connection with at least one of the figures, as set forth more completely in the claims.

DETAILED DESCRIPTION

Figure 1:
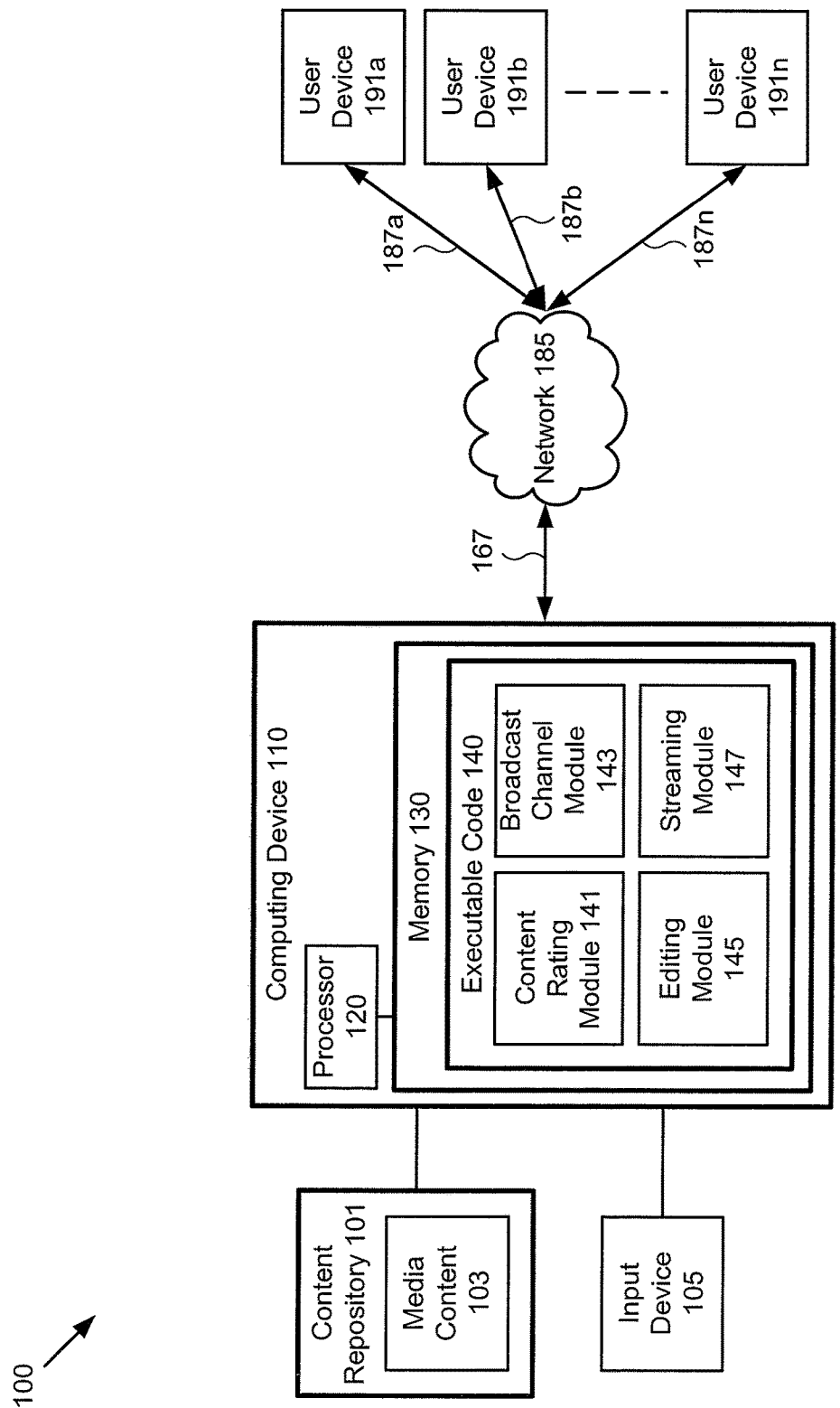
FIG. 1 shows a diagram of an exemplary system for creating a broadcast channel playing media contents based on user ratings, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for creating a broadcast channel playing media contents based on user ratings, according to one implementation of the present disclosure. System 100 includes content repository 101, input device 105, computing device 110, network 185, and a plurality of user devices 191a, 191b, . . . , 191n. Content repository 101 may include a plurality of media contents, such as media content 103, and may be stored on a media server. In some implementations, content repository 101 may be stored on a media server operated by a content provider, a media server operated by a third party, on a plurality of media servers, in memory 130, etc.

Input device 105 may be a device, such as a computer, for an editor to provide editing input to edit media content 103. In some implementations, input device 105 may include a keyboard, a mouse, a touch screen, etc. Input device 105 may allow an editor to add content to media content 103, such as by adding an advertisement, remove content from media content 103, such as by removing one or more frames of video content from media content 103, alter media content 103, such as by obscuring a logo displayed on an item in media content 103, etc.

Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140, which includes one or more software modules stored in memory 130 for execution by processor 120 of commuting device 110. As shown in FIG. 1, executable code 140 includes content rating module 141, broadcast channel module 143, editing module 145, and streaming module 147. Content rating module 141 is a software module for execution by processor 120 to associate a rating assigned by a user with media content 103. Content rating module 141 may receive rating inputs from one or more of user devices 191a, 191b, . . . , 191n each rating media content 103. Rating inputs may indicate a user rating for media content 103, such as rating media content four out of five stars, etc. In some implementations, content rating module 141 may average the plurality of rating inputs to determine a rating for media content 103. The rating of media content 103 may be an average of all rating inputs received from users, and average of rating inputs received during a specific time period, such as the last six months, one week, one day, etc.

Broadcast channel module 143 is a software module for execution by processor 120 to create a broadcast channel including a plurality of media contents, such as media content 103. In some implementations, broadcast channel module 143 may receive content ratings from content rating module 141 and may sort the associated media contents, including media content 103, according to the user ratings. Broadcast channel module 143 may place the highest rated media content at the top of the list, where the media content at the top of the list is next to play on the broadcast channel. Based on ratings received from content rating module 141, broadcast channel module 143 may determine that media content 103 is a top rank media content and is next on the broadcast channel.

Editing module 145 is a software module for execution by processor 120 to edit media contents of the broadcast channel, such as media content 103. Editing module 145 may receive editing input form input device 105. Editing module 145, based on the editing input, may add content, such as advertisements, to media content 103, and/or remove content from media content 103. For example, editing module 145 may remove a portion of media content 103 by obscuring a portion of one or more frames of media content 103. Obscuring may be used to remove the face of a person, for example, a bystander in a home video, or the logo of a branded product, such as a logo on a shirt, hat, shoe, car, etc. In other implementations, editing module 145 may remove one or more frames from media content 103. Editing module 145 may be used to remove objectionable content, content that the broadcaster does not have the rights to broadcast, content to adjust the duration of media content 103, etc.

Streaming module 147 is a software module for execution by processor 120 to transmit a broadcast channel, including media content 103, to user devices 191a, 191b, . . . , 191n. In some implementations, streaming module 147 may transmit the media channel using an over-the-air channel, a cable television channel, an Internet channel, and/or a video-on-demand (VOD) channel. In some implementations, streaming module 147 may transmit the broadcast channel to user devices 191a, 191b, . . . , 191n over network 185. Network 185 may be a computer network, such as the Internet. Computing device 110 may be connected to network 185 via connection 167, and user devices 191a, 191b, . . . , 191n may be connected to network 185 via corresponding connections 187a-187n. User devices 191a, 191b, . . . , 191n may be devices capable of creating, editing, and/or viewing media contents such as media content 103 and/or the broadcast channel created by broadcast channel module 143. In some implementations, user devices 191a, 191b, . . . , 191n may include a television, a computer, a tablet computer, a mobile phone, etc.

Figure 2:
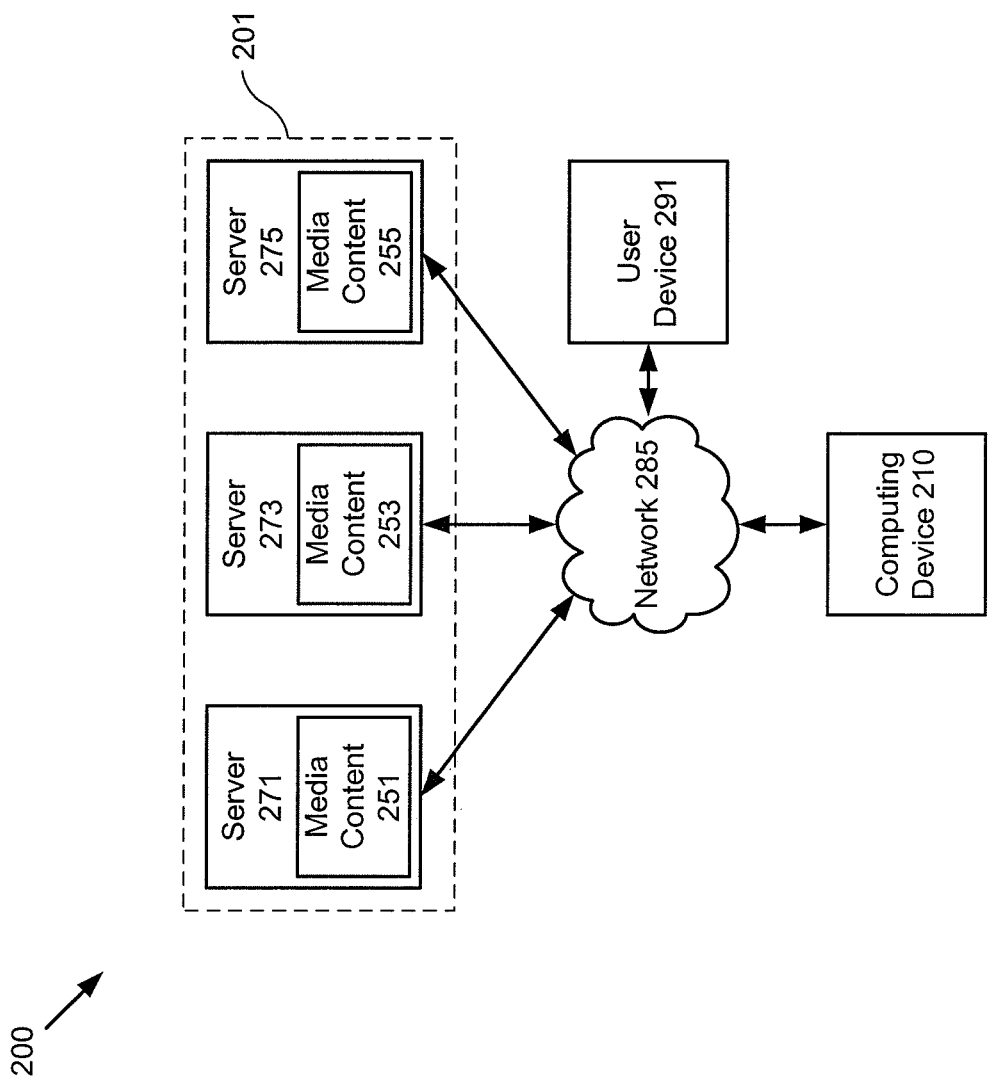
FIG. 2 shows a diagram of an exemplary system for creating the broadcast channel playing media contents based on user ratings, according to one implementation of the present disclosure.

FIG. 2 shows a diagram of an exemplary system for creating the broadcast channel playing media contents based on user ratings, according to one implementation of the present disclosure. Diagram 200 includes content repository 201, computing device 210, network 285, and user device 291. As shown in FIG. 2, content repository 201 includes server 271, server 273, and server 275. Servers 271-275 include corresponding media contents, media content 251, media content 253, and media content 255. In some implementations, different media services may operate servers 271-275. For example, server 271 may be operated by a social media website, server 273 may be operated by a television network, and server 275 may be operated by a video sharing website. In other implementations, servers 271-275 may be operated by the same content provider and/or servers 271-275 may be the same server.

To create a broadcast channel, computing device 210 may provide user device 291 with access to content repository 201 via network 285. In some implementations, a user of user device 291 may provide a rating input for each of media content 251, media content 253, and media content 255. For example, the user may rate media content 251 three out of five stars, media content 523 five out of five starts, and media content 255 one out of five stars. Content rating module 141 may calculate a rating for each of media content 251, media content 253, and media content 255 by averaging the total user ratings assigned to each, resulting in media content 251 having a rating of four-point-one (4.1) out of five stars, media content 253 having a rating of four-point-nine (4.9) out of five stars, and media content 255 having a rating of three-point-two (3.2) out of five starts. Broadcast channel module 143 may have a threshold, such as four-point-five (4.5) stars out of five stars, and may add media content 253 to the queue of the broadcast channel if the rating of media content 253 reaches and/or surpasses the threshold.

In some implementations, creating the broadcast channel may include downloading the media contents to be included, such as media content 253, and saving the media content 253 on computing device 210, and computing device 210 may stream the broadcast channel to user device 291 via network 285. In other implementations, creating the broadcast channel may include locating the media contents to be included and creating a playlist or manifest file including a location for each included media content, such as a URL for such as media content 253. Computing device 210 may stream the media channel to user device 291 using the playlist or manifest file.

Figure 3:
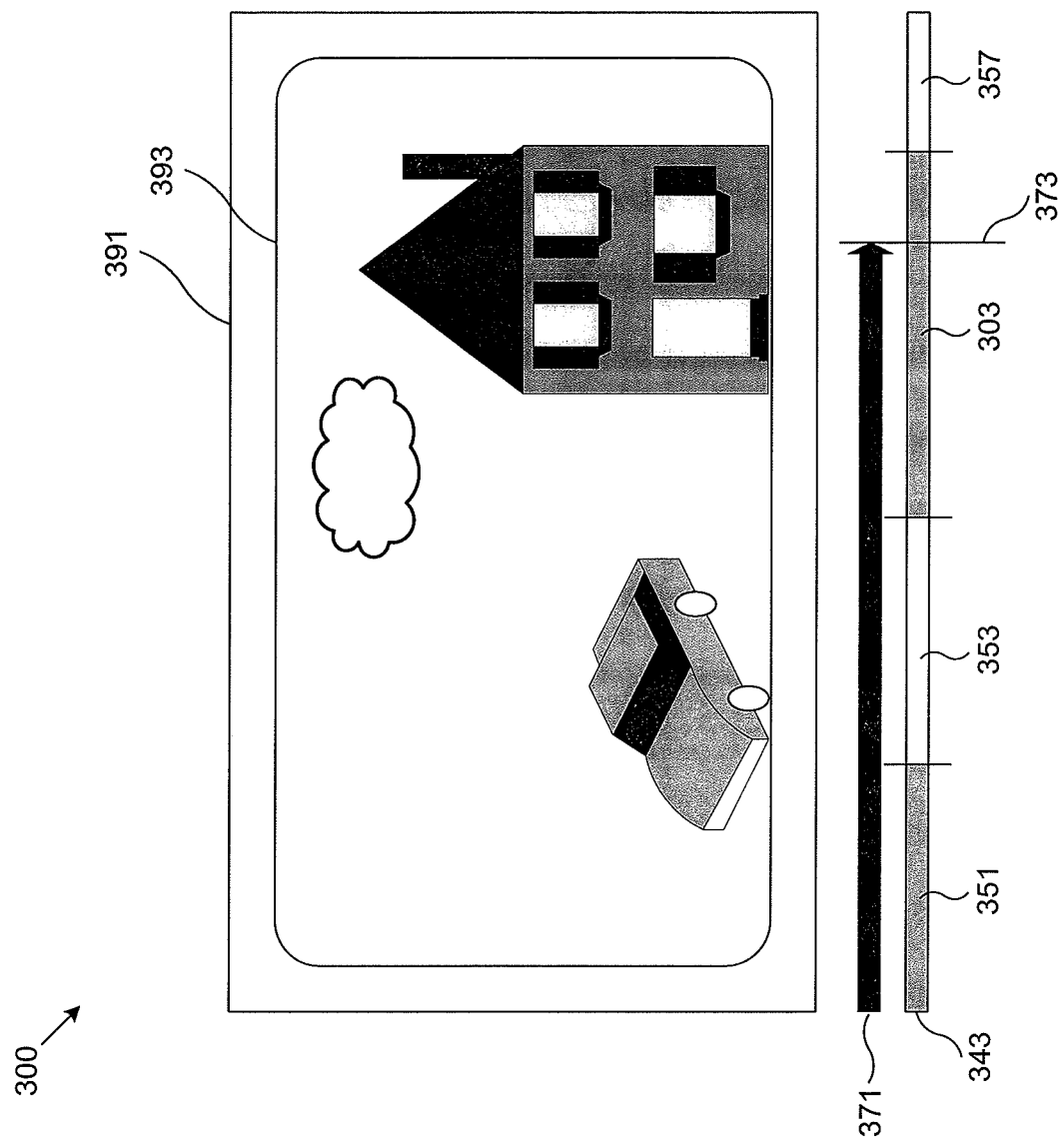
FIG. 3 shows a diagram of an exemplary user device displaying a media content on the broadcast channel created using the system of FIG. 1, according to one implementation of the present disclosure.

FIG. 3 shows a diagram of an exemplary user device displaying media content 303 on broadcast channel 343 created using the system of FIG. 1, according to one implementation of the present disclosure. Diagram 300 shows display 393 of user device 391 playing broadcast channel 343. Broadcast channel 343 includes media contents 351, 353, 303, and 357, and the playback progress of media channel 343 is indicated by playback arrow 371.

Figure 4:
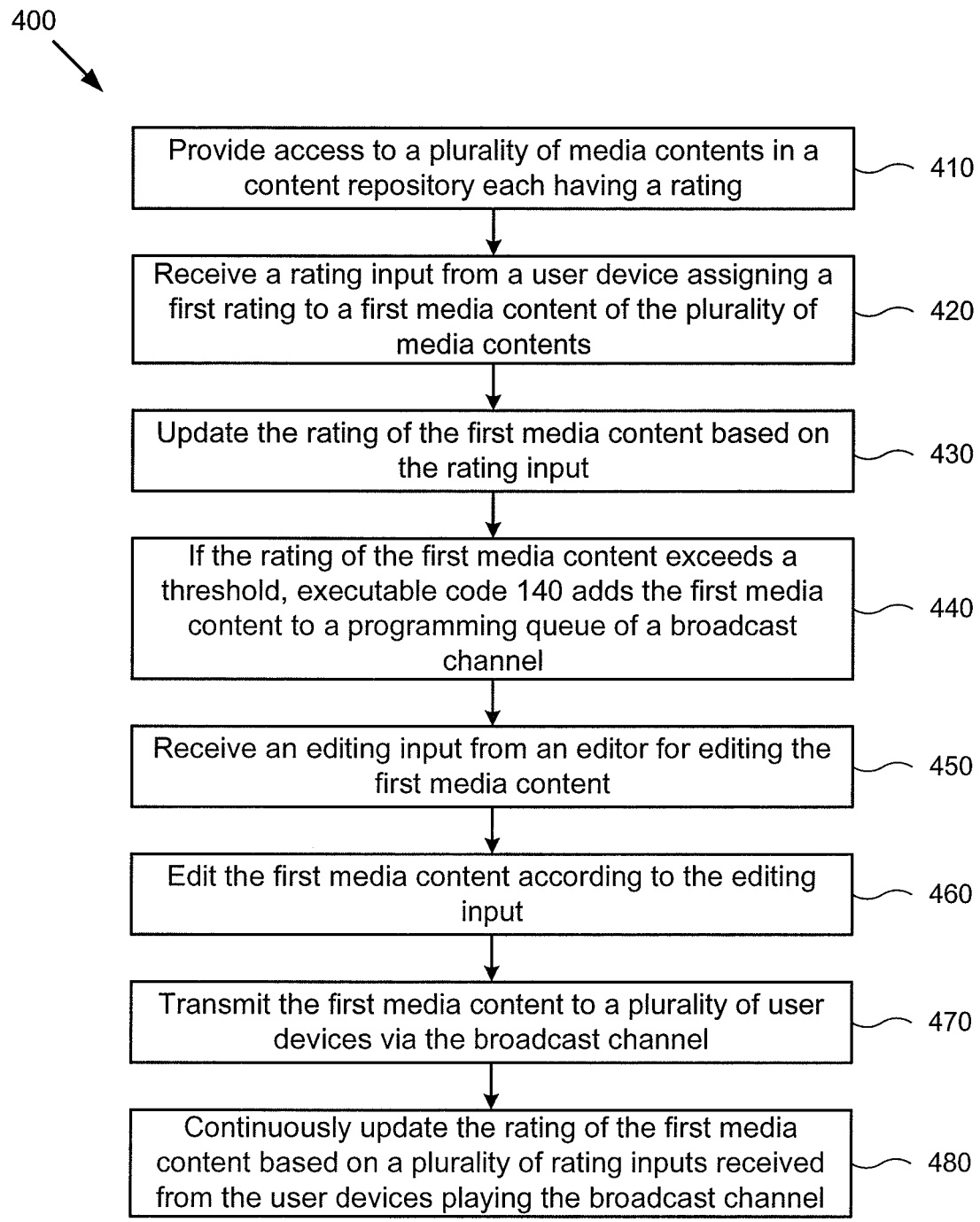
FIG. 4 shows a flowchart illustrating an exemplary method of creating a broadcast channel playing media contents based on user ratings, according to one implementation of the present disclosure.

FIG. 4 shows a flowchart illustrating an exemplary method of creating a broadcast channel playing media contents based on user ratings, according to one implementation of the present disclosure. Method 400 begins at 410, where executable code 140 provides access to a plurality of media contents in a content repository, wherein each of the plurality of media contents has a rating. In some implementations, computing device 110 may require a user to first sign in to a user account before providing access to content repository 101. The content repository may include media contents stored on one or more media servers.

At 420, executable code 140 receives a rating input from user device 191a assigning a user rating to media content 103. The user rating may be a rating on a scale, such as rating media content 103 on a scale between one (1) and ten (10) or assigning a rating value using an icon, such as rating media content 103 between one (1) star and five (5) stars. In some implementations, the user may rate media content one time, such that the rating assigned by the user is saved and associated with the user account used to enter the rating input. The user may enter the rating using input device 105, for example, using a keyboard, mouse, or other user interface to indicate the user rating of media content 103.

At 430, executable code 140 updates the rating of media content 103 based on the rating input. In some implementations, content rating module 141 may update the rating of the first media content by averaging a plurality of user ratings for media content 103. The user ratings used to for determining and/or updating the rating of media content 103 may include user ratings submitted during a specific time frame. For example, content rating module 141 may average user ratings submitted within the previous day, week, year, etc. Based on the user rating received at 420 and the previous rating of media content 103, content rating module 141 may increase the rating of media content 103, decrease the rating of media content 103, or leave the rating of media content 103 unchanged.

At 440, if the rating of the first media content exceeds a threshold, executable code 140 adds the first media content to a programming queue of a broadcast channel. Broadcast channel module 143 may have a threshold rating that media contents must meet before being included on the broadcast channel. Based on the threshold, broadcast channel module 143 may create and/or update one or more broadcast channels. In some implementations, the broadcast channel may include a plurality of media contents, including media content 103. To be added to the broadcast channel, the rating of media content 103 may need to reach and/or surpass the threshold for the broadcast channel. The threshold may be a minimum rating, meaning the rating of media content 103 must be/exceed at least a certain rating, a maximum rating, meaning the rating of media content 103 must not meet/exceed a certain rating, a rating count, meaning media content 103 must receive/exceed a minimum number of user ratings within a certain timeframe, such as one hour, one day, etc. Once media content 103 meets/exceeds the threshold for the broadcast channel, broadcast channel module 143 may add media content 103 to the programming queue for the broadcast channel.

The programming queue for the broadcast channel may include a plurality of media contents, each of which has met the rating threshold for the broadcast channel. In some implementations, media content 103 may meet the rating threshold for the broadcast channel more than one time. In such a situation, broadcast channel module 143 may place media content 103 in the programming queue more than once, for example, once for each time media content 103 satisfies the threshold requirement, or broadcast channel module 143 may adjust the position of media content 103 in the programming queue based on the plurality of times media content 103 satisfies the threshold requirement.

At 450, executable code 140 receives an editing input from an editor for editing the first media content. In some implementations, an editor may monitor the media contents included in the programming queue for the broadcast channel. The editor may monitor media contents for opportunities to include an advertisement, content that may be offensive and/or undesirable, content that requires permission and/or legal clearance prior to broadcasting, etc. When the editor discovers an editing instance, the editor may enter an edit using input device 105. For example, the editor may observe a break between media content 103 and a subsequent media content, and the editor may insert an advertisement into the programming queue of the broadcast channel, or the editor may observe a visible brand logo in media content 103 and the editor may enter an editing input using input device 105 to obscure and/or remove the brand logo from media content 103. Method 400 continues at 460, where executable code 140 edits the first media content according to the editing input. In some implementations, editing module 145 may execute the edit received at 450. At 470, executable code 140 transmits the first media content, including edits, to user devices 191a, 191b, . . . , 191n via the broadcast channel.

At 480, executable code 140 continuously updates the rating of the first media content based on a plurality of rating inputs received from a corresponding plurality of user devices playing the broadcast channel. In some implementations, content rating module 141 may receive rating inputs from one or more of user devices 191a, 191b, 191n, for example, while users are watching the broadcast channel.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code; and
a hardware processor executing the executable code to:
provide access, via a social media platform, to a plurality of media contents in a content repository, wherein each of the plurality of media contents has a rating;
receive a rating input, via the social media platform, from a first user device assigning a user rating to a first media content of the plurality of media contents, the first media content comprising a plurality of video frames including one or more first video frames and one or more second video frames different than the one or more first video frames; and
update the rating of the first media content based on the rating input;
wherein responsive to the rating of the first media content exceeding a threshold within a timeframe, the hardware processor further executes the executable code to:
add the first media content to a television programming queue of a broadcast channel of a cable television platform;
receive an editing input from an editor for editing the first media content added to the television programming queue;
edit the first media content added to the television programming queue according to the editing input to remove or obscure only a portion of the one or more first video frames of the first media content based on lack of rights to broadcast the portion of the first media content via the television broadcast channel of the cable television platform; and
transmit the edited first media content to a plurality of second user devices via the television broadcast channel of the cable television platform.

2. The system of claim 1, wherein the editor monitors the television broadcast channel for providing the editing input.

3. The system of claim 1, wherein the hardware processor further executes the executable code to:
continuously update the rating of the first media content based on a plurality of rating inputs received from the plurality of second user devices playing the television broadcast channel.

4. The system of claim 1, wherein the rating of each of the plurality of media contents is an average of a plurality of user ratings.

5. The system of claim 1, wherein the user rating assigns a value to the first media content on a rating scale.

6. The system of claim 1, wherein the content repository includes at least one of a content owner server or a third party server.

7. The system of claim 1, wherein the television broadcast channel delivers comments associated with the first media content, and wherein the comments are displayable along with the first media content on the plurality of second user devices.

8. The system of claim 1, wherein the editing input is to remove or obscure a logo appearing in the one or more first video frames of the first media content.

9. The system of claim 1, wherein the editing input is to remove or obscure a face of a person appearing in the one or more first video frames of the first media content.

10. A method for use with a system including a non-transitory memory and a hardware processor, the method comprising:
providing, using the hardware processor and via a social media platform, access to a plurality of media contents in a content repository, wherein each of the plurality of media contents has a rating;
receiving, using the hardware processor and via the social media platform, a rating input from a first user device assigning a user rating to a first media content of the plurality of media contents, the first media content comprising a plurality of video frames including one or more first video frames and one or more second video frames different than the one or more first video frames;

updating, using the hardware processor, the rating of the first media content based on the rating input;

responsive to the rating of the first media content exceeding a threshold within a timeframe:

adding, using the hardware processor, the first media content to a television programming queue of a television broadcast channel of a cable television platform;

receiving an editing input from an editor for editing the first media content added to the television programming queue;

editing the first media content added to the television programming queue according to the editing input to remove or obscure only a portion of the one or more first video frames of the first media content based on lack of rights to broadcast the portion of the first media content via the television broadcast channel of the cable television platform; and transmitting, using the hardware processor, the edited first media content to a plurality of second user devices via the television broadcast channel of the cable television platform.

11. The method of claim 10, wherein the editor monitors the television broadcast channel for providing the editing input.

12. The method of claim 10, further comprising:

continuously updating, using the hardware processor, the first rating based on a plurality of rating inputs received from the plurality of second user devices playing the television broadcast channel.

13. The method of claim 10, wherein the rating of each of the plurality of media contents is an average of a plurality of user ratings.

14. The method of claim 10, wherein the user rating assigns a value to the first media content on a rating scale.

15. The method of claim 10, wherein the content repository includes at least one of a content owner server or a third party server.

16. The method of claim 10, wherein the television broadcast channel delivers comments associated with the first media content, and wherein the comments are displayable along with the first media content on the plurality of second user devices.

17. The method of claim 10, wherein the editing input is to remove or obscure a logo appearing in the one or more first video frames of the first media content.

18. The method of claim 10, wherein the editing input is to remove or obscure a face of a person appearing in the one or more first video frames of the first media content.

* * * * *